(12) United States Patent
Gilbert

(10) Patent No.: US 7,580,374 B1
(45) Date of Patent: Aug. 25, 2009

(54) SYSTEMS AND METHODS FOR SETTING FUTURE TELECONFERENCE CALLS

(75) Inventor: Lanny Gilbert, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 69 days.

(21) Appl. No.: 09/873,709

(22) Filed: Jun. 4, 2001

Related U.S. Application Data

(63) Continuation of application No. 09/747,402, filed on Dec. 22, 2000, now abandoned.

(51) Int. Cl.
*H04L 12/16* (2006.01)

(52) U.S. Cl. .................. 370/260; 370/261; 370/262; 370/270; 379/202.01

(58) Field of Classification Search .......... 370/260, 370/261, 262, 265, 270, 271, 352, 395.5, 370/395.52, 401, 402, 395.4; 379/202.01, 379/203.01, 204.01, 207.03, 205.01
See application file for complete search history.

(56) References Cited

U.S. PATENT DOCUMENTS

| | | | | |
|---|---|---|---|---|
| 5,483,587 A | * | 1/1996 | Hogan et al. ........... 379/202.01 |
| 5,546,324 A | * | 8/1996 | Palmer et al. ............. 348/14.1 |
| 5,953,393 A | * | 9/1999 | Culbreth et al. .......... 379/88.25 |
| 6,178,183 B1 | * | 1/2001 | Buskirk, Jr. ................. 370/493 |
| 6,181,786 B1 | * | 1/2001 | Detampel et al. ....... 379/205.01 |
| 6,275,575 B1 | * | 8/2001 | Wu ........................ 379/202.01 |
| 6,282,278 B1 | * | 8/2001 | Doganata et al. ............ 379/202 |
| 6,421,324 B1 | * | 7/2002 | Boyle et al. ................. 370/261 |
| 6,456,709 B1 | * | 9/2002 | Cox et al. .............. 379/218.01 |
| 6,501,740 B1 | * | 12/2002 | Sun et al. .................... 370/261 |
| 6,584,076 B1 | * | 6/2003 | Aravamudan et al. ....... 370/260 |
| 6,600,725 B1 | * | 7/2003 | Roy ........................... 370/261 |
| 6,697,341 B1 | * | 2/2004 | Roy ........................... 370/260 |

* cited by examiner

*Primary Examiner*—William Trost, IV
*Assistant Examiner*—Toan D Nguyen
(74) *Attorney, Agent, or Firm*—Cantor Colburn LLP

(57) ABSTRACT

Systems and methods relate to setting-up a future telephone conference between a host party and at least one participant party. The host party dials into a system and enters the meeting date/time and meeting parties' telephone numbers. At the meeting time, the system retrieves the information from its database and dials the meeting participants.

19 Claims, 6 Drawing Sheets

SYSTEMS AND METHODS FOR SETTING FUTURE TELECONFERENCE CALLS

RELATED APPLICATION

This application is a continuation and claims the priority of the U.S. patent application Ser. No. 09/747,402 filed on Dec. 22, 2000 now abandoned.

FIELD OF THE INVENTION

The present invention relates to telecommunications and more particularly relates to systems and methods for setting up calls.

BACKGROUND OF THE INVENTION

New technology development makes life easier and busier at the same time. Now, we accomplish more in one day than what we used to accomplish in one week years ago. As we increase our productivity, we are able to handle more tasks from more sources. A salesperson can handle more customers with orders, a lawyer can have more clients with cases, and an engineer can handle more supervisors with requests. This increase of tasks brings also more human interactions. More meetings are setup in work environments, and more teleconferences are set between geographically distant parties. The need for these meetings and teleconferences often arises during a conversation with another party or when an issue comes to mind while we are engaged in other activities. It is not always possible for us to record a reminder to ourselves to make a call to a particular party at later time, and as a consequence, we often forget to make the call to the other party.

When we are able to leave a note to remind ourselves to make a call at a particular time to a third party, we do not always remember to make such a call at that particular time. We may be engaged in other activity and totally forget to make the call, or we may be available to make the call, but we do not have the other party's telephone number close at hand.

The inability to make a timely call may cause a business to lose potentially lucrative opportunities, or create other detrimental implications for one's business. Therefore, there is a need for systems and methods to allow people to setup future conference calls and to be reminded about the calls in the future.

SUMMARY OF THE INVENTION

The present invention relates to, in its preferred embodiments, systems and methods for setting up future conference calls between at least two parties. A system according to the present invention has a server connected to a public switched telephone network (PSTN) or to the Internet. The server accepts meeting requests from users, who are located remotely, and setup one data entry for each meeting request. The meeting request has the following information: meeting date, meeting time, host's telephone number, and participants' telephone numbers. The server is also connected to a signaling system that enables the server to setup conference calls between two or more parties. The signaling system also permits the server to learn about the incoming calls to setup meeting requests. The server can learn whether a meeting request is from a landline telephone or a cellular telephone. The server can be operated by local telephone companies or independent operators, and the service provided by the server can be paid per usage or on a subscription basis.

Users can input meeting requests anywhere and anytime by using any cellular or landline telephone or through the Internet, such as by using a computer or a personal digital assistance (PDA). A user can setup a future meeting request by using his landline or wireless telephone and dialing into the server. The server prompts the user for the meeting time, the user's telephone number or the host telephone number, and the telephone number of any other participant. The host telephone number does not have to be the telephone number used to setup the meeting request. If a meeting request is from a landline telephone number, then the server plays a series of audio prompts for the caller to enter the meeting information. If the meeting request is from a cellular telephone number with a LCD display screen, the server may send a display menu for the user to enter the meeting information. The meeting can be setup between two parties, a host and a participant, or more parties, if the switching platform is equipped with conferencing capabilities. Some switching platforms are equipped with conferencing bridge hardware that supports up to 6 conferencing parties per each bridge hardware. The meeting request can also be entered by use of a web page displayed on a computer screen, when the computer is connected to the Internet. The server provides web pages that accept meeting requests from the user, and the meeting request information is sent to the server through the Internet. The meeting information entered via the web page is transmitted through the Internet to the server. Alternatively, the input page can also be displayed on a PDA such as a PalmPilot™, if the PDA is equipped with radio frequency transmission capabilities. The PDA can communicate with a server through a wireless connection and the Internet.

The server stores the meeting requests in a database. Each meeting request has an entry in the database, and each entry has a timer attached to it. At the meeting time, first the server requests a connection to be setup to the host telephone number, and when the host telephone is answered, then the server requests another connection to be setup to a meeting participant. When the meeting participant answers the telephone, the two connections are bridged on a switch and the server is free to handle other conferences. If the host telephone number is not answered, then the server will retry later. The server may retry a few times before dropping this conference request. If there are multiple participants besides the host, the server will dial all the participants and bridge their connections with the host.

The system according to the preferred embodiment of the present invention allows a user to setup a future conference call from any telephone device or any computing device with access to the Internet. The user can setup a teleconference between his cellular telephone that he carries with him and another telephone, and the system will call his cellular telephone at the time of the meeting without any further action upon his part. This solves the problem of remembering the meeting time and remembering the conference parties' telephone numbers.

DESCRIPTION OF THE DRAWINGS

The foregoing and other objects, aspects, and advantages will be better understood from the following detailed description of a preferred embodiment of the invention with reference to the drawings, in which.

DETAIL DESCRIPTION OF THE INVENTION

The terms "conference" and "meeting" are used interchangeably in this specification.

Figure 1:
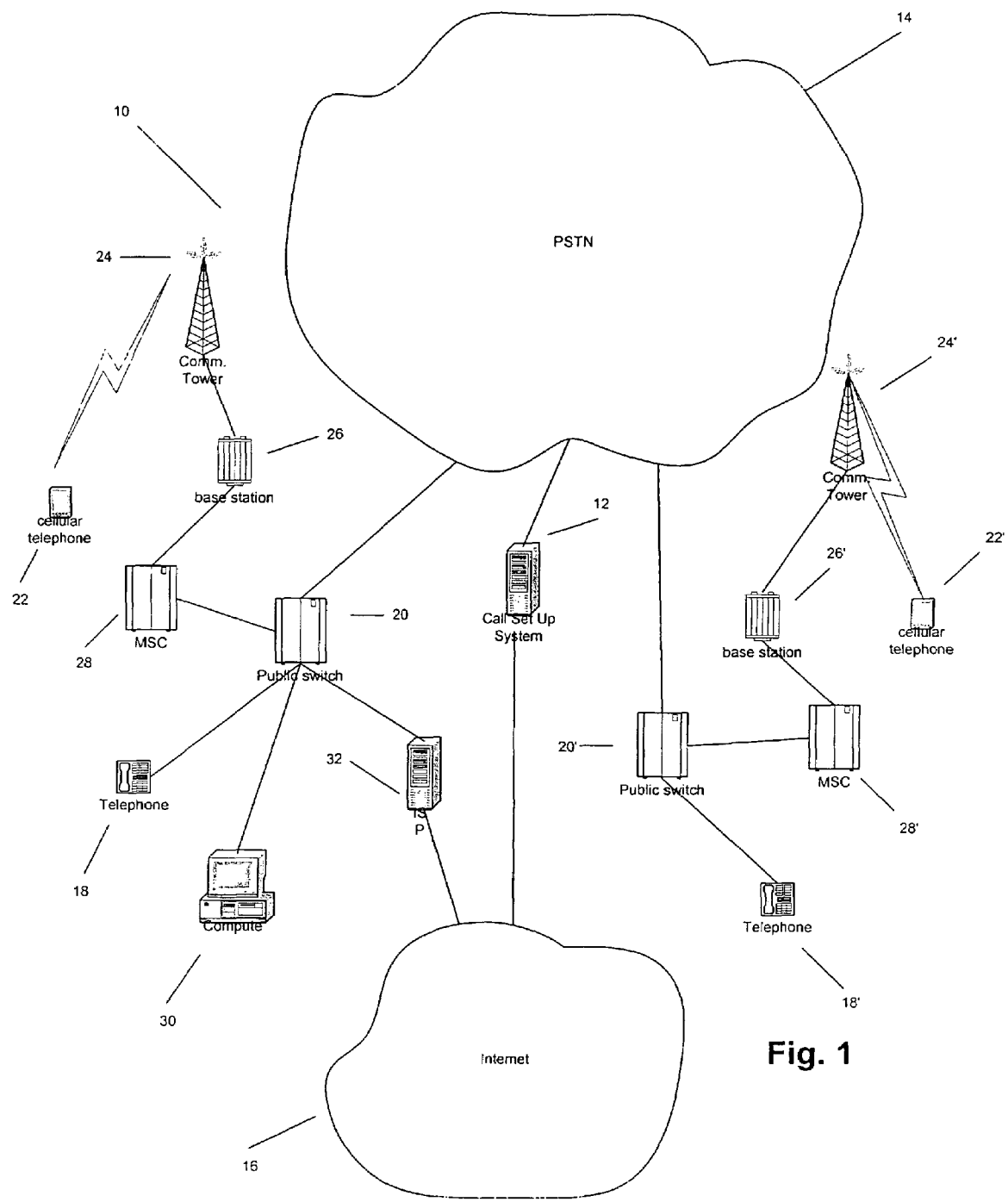
FIG. 1 is schematic illustration of a system according to the present invention.

Referring now in greater details to the drawings, in which like numerals represent like components throughout several views, FIG. 1 is a schematic illustration of a network 10 according to the present invention. The network 10 has a call set-up system 12 connected to a public switched telephone network (PSTN) 14 and to the Internet 16. The call set-up system 12 by a plurality of communication devices and computing devices. For example, the call set-up system 12 is accessible by a landline telephone 18 connected to a public switch 20 and by a cellular telephone (radiotelephone) 22 through radio frequency transmissions to a communication tower 24 attached to a base station 26. The base station 26 is connected to a mobile switching center (MSC) 28, which is connected to a public switch 20. The call set-up system 12 can also be accessed by a computer 30 connected to an Internet service provider (ISP) 32 through telephone connections. The cellular telephone 22 can alternatively be a handheld personal digital assistance (PDA) device.

A user may be talking to his client and decide to setup a teleconference for the following week with this client to further discuss an issue. The user can use his cellular telephone 22 to setup a future conference call for the following week. He dials an access number, which may be a toll free number or any other number provided by the service provider, to gain access to the call set-up system 12. His cellular telephone 22 communicates through radio frequency signals to a communication tower 24, which is connected to a base station 26. His call is handled by a MSC 28, which will check the dialed number and route it through a public switch 20 and the PSTN 14 to the call set-up system 12. The call set-up system 12 prompts for the meeting date, the meeting time, the host telephone number, and at least one participant's telephone number. The host telephone number can be a telephone number other than one the user is using to setup the future conference call. If the user knows that he will be at his office at the meeting time, he may enter his office telephone number. If a secretary is setting-up a teleconference for her supervisor, the secretary may enter the supervisor's telephone number as the host telephone number. The teleconference can have one or more participants beside the host, if the telephone switch used by the call set-up system is equipped with proper conferencing hardware. If the telephone switch has conferencing hardware that supports six parties, then a total of six parties can be connected to a teleconference. The user can also setup a future conference call by using a landline telephone 18. The call from the landline telephone 18 is handled by a public switch 20 and routed through the PSTN 14, if necessary, to the call set-up system 12.

The user can also use his computer to setup a future conference call. The user may be reading his e-mails on his computer when he realizes that he has to call his salesperson in another state the following day. He can setup a future conference call by using his computer. He accesses the call set-up system 12 web site, and inputs the meeting information such as meeting date/time, the host telephone number and the participant's telephone number into the web page. The information is transmitted through the Internet to the call set-up system 12. The computer 30 can be connected to the Internet in a number of ways, such as directly connected to a local area network (LAN) that is linked to the Internet 16, or connected to an Internet service provider (ISP) 32, which is connected to the Internet 16, through a telephone connection.

In an alternate embodiment, when the user is using a cellular telephone 22 with a liquid crystal display (LCD) screen, the call set-up system 12 may send an input screen to the cellular telephone 22 and the user can input the meeting information through the cellular telephone 22 keypad. The information entered is then transmitted back to the call set-up system 12.

The call set-up system 12 has access to a signaling system such as a common channel signaling system (CCSS). The signaling system allows the call set-up system 12 to setup conference calls between multiple parties.

Figure 2:
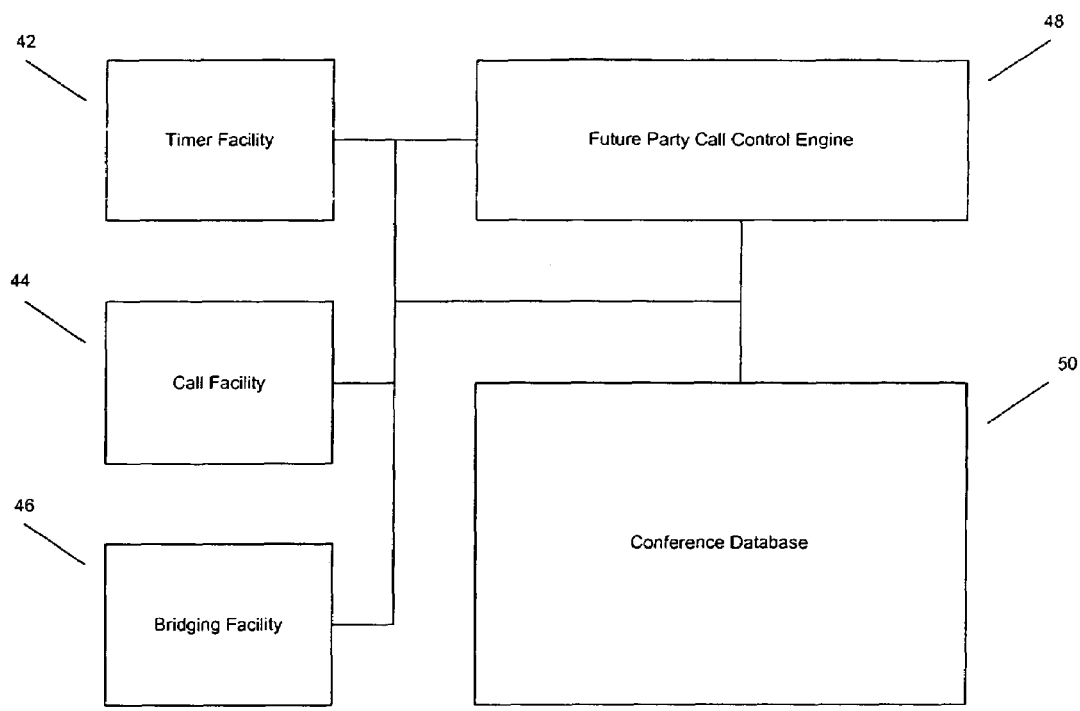
FIG. 2 is a block diagram of software modules in a server according to an embodiment of the present invention.

The call set-up system 12 has a timer facility 42, a call facility 44, a bridging facility 46, a call control engine 48, and a conference database 50 as shown in FIG. 2. The control engine 48 handles meeting requests for a conference call setup. Meeting requests arrive at the call set-up system 12, and the call control engine 48 stores them in the database 50. Each meeting request is entered into an entry in the database 50. A timer in the timer facility 42 is created and associated with each individual entry. When the timer for an entry expires, the call control engine 48 then retrieves the meeting information from the entry. The call facility 44 first makes a call to the party hosting the meeting. After the hosting party answers the call, the call facility 44 then makes a call to the second party. If there are more than two parties in the meeting, the call facility 44 calls all the parties listed in the entry. After the calls are answered by at least two parties, the bridging facility 46 proceeds to bridge the calls. A public switch connected to the call set-up system 12 can handle the call bridging, and the call set-up system 12 is free to handle other meeting requests.

In an alternate embodiment, instead of creating individual timers for each entry, the call control engine 48 can also poll periodically each entry to see whether it is the time to setup the conference call for the parties listed in that entry.

Figure 3:
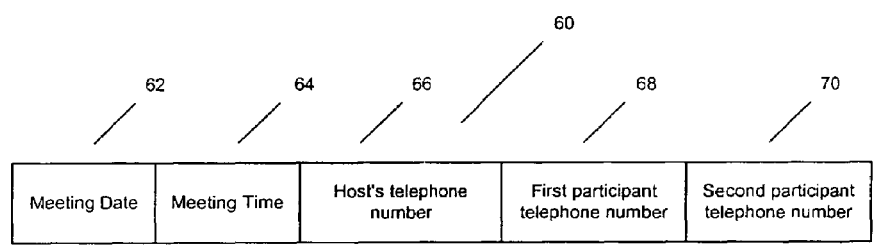
FIG. 3 is an entry of the database according to an embodiment of the present invention.

FIG. 3 is an illustration of a database entry 60 according to a preferred embodiment of the present invention. The entry 60 stores the meeting information, such as the meeting date 62, the meeting time 64, the host's telephone number 66, the first participant's telephone number 68, and optionally the second participant's telephone number 70. Optionally, the entry 60 can store information about as many participants as the number of the participants that the conferencing hardware supports. The call control engine 48 receives meeting requests, such as from users using cellular telephones 22, landline telephones 18, or computers 30. The meeting date 62 and meeting time 64 are checked before a new entry is created for the meeting. If the meeting date 62 and meeting time 64 have passed already, the call control engine 48 will reject the meeting request. The meeting request can have more than two parties. The call control engine 48 will reject meeting requests with only one party.

Figure 4:
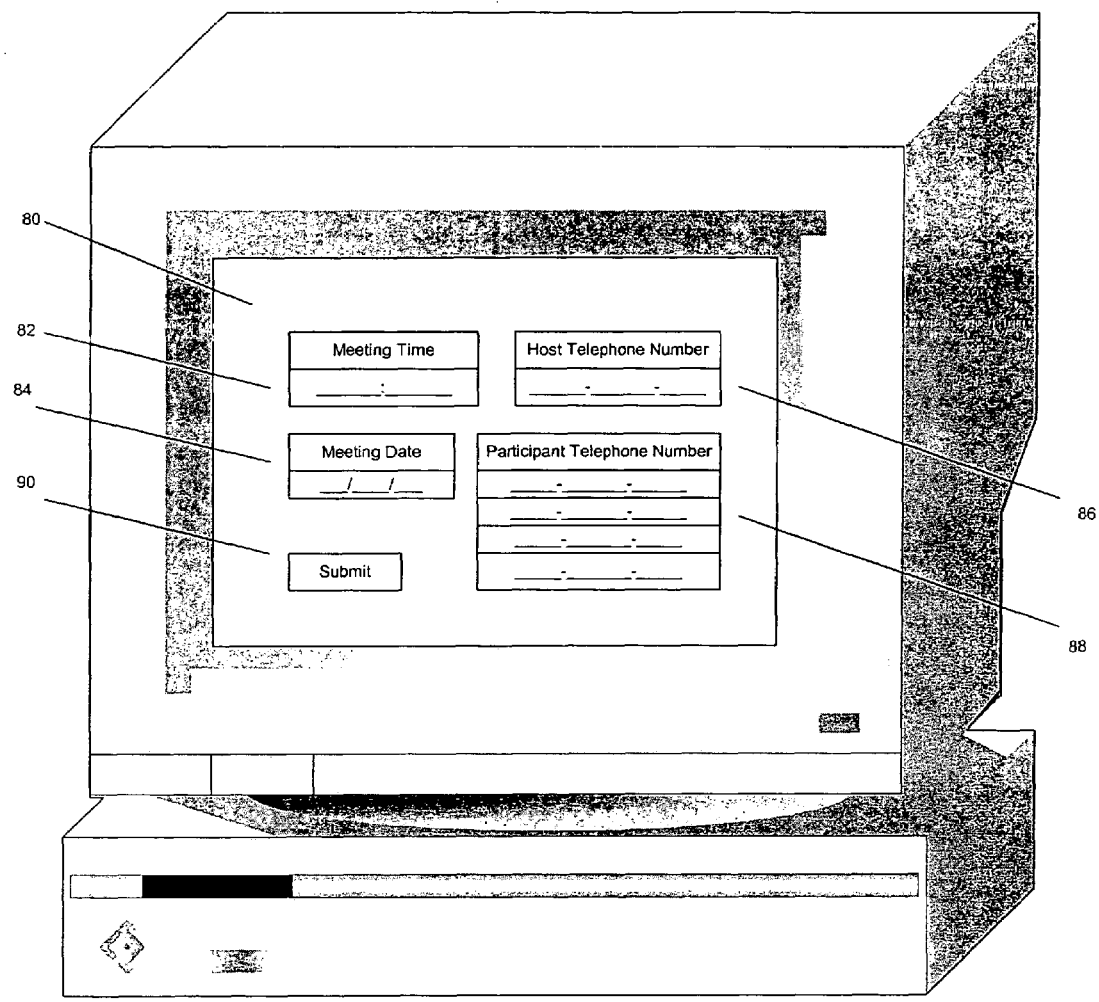
FIG. 4 is an illustration of an input screen on a computer.

FIG. 4 illustrates how a user can use a computer 30 to setup a future conference call. First, the user connects his computer 30 to an ISP 32, if his computer 30 accesses the Internet 16 through an ISP 32. If his computer 30 is connected to a LAN linked to the Internet 16, then he can access the call set-up system 12 without dialing into an ISP 32. After connecting to a call set-up system 12, an input page 80 is displayed in the computer 30's screen. The input page 80 has the following fields for entering meeting information: meeting time 82, meeting date 84, host telephone number 86, list of participants telephone numbers 88, and a "submit" button 90. The user enters the meeting information on each field and then clicks the "submit" button 90 to have information transmitted to the call set-up system 12. After the meeting request is accepted, the call set-up system 12 sends a confirmation screen to the computer 30. If the meeting request contains errors, the call set-up system 12 will ask the user to re-enter the information. The input screen can be written in Hyper Text Markup Language (HTML), eXtended Markup Language (XML), or any other computer language suitable for this purpose. The information transfer between the call set-up system 12 and the computer 30 follows industry protocols such as Transfer Control Protocol/Internet Protocol (TCP/IP).

Figure 5:
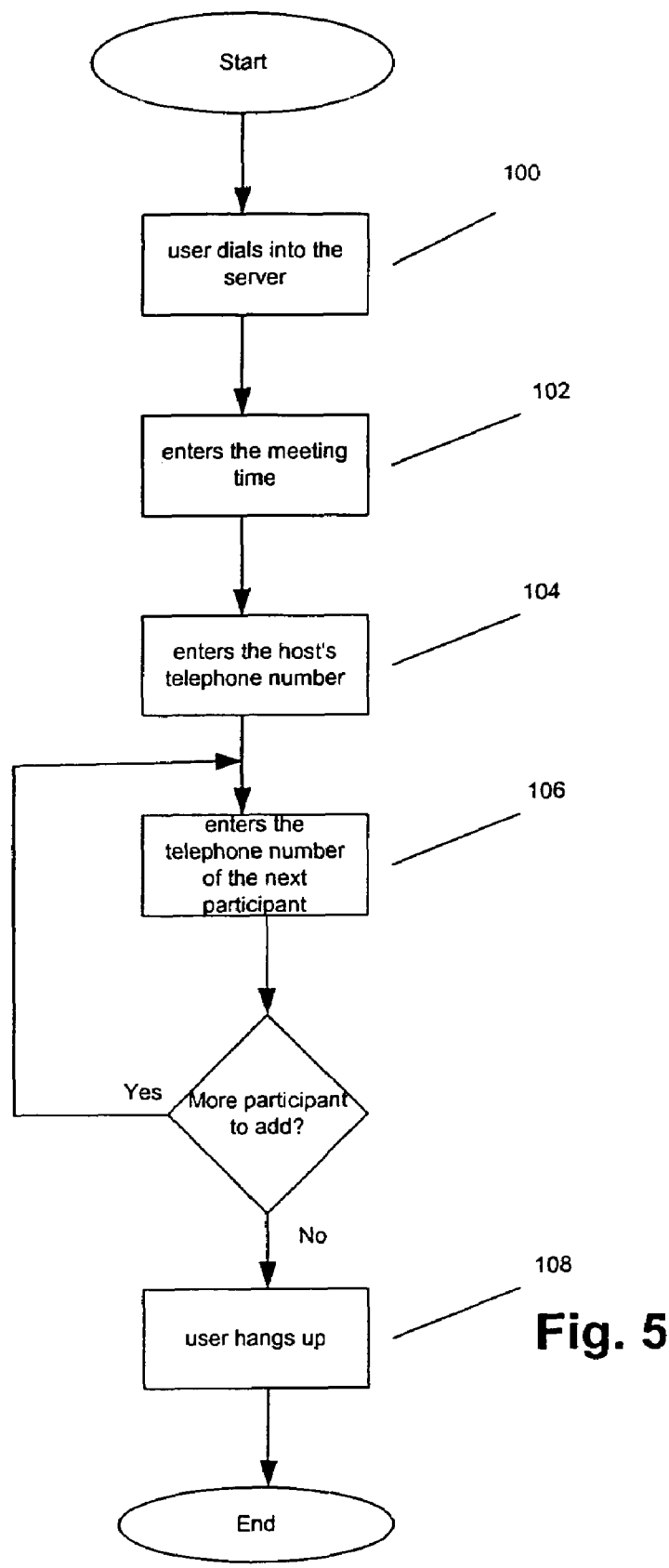
FIG. 5 is a flowchart for inputting a future conference request.

FIG. 5 depicts a user process for a user to setup a future conference call according to the present invention. For example, a scientist, while doing his experiments in late evening, remembers that he needs to discuss with his colleague about his findings from the experiment. Instead of abandoning his experiments to search for his agenda to make an appointment for him to call his colleague the next day or continuing with his experiment and risking not remembering to make the call the next day, he can simply grab a telephone and dial into the call set-up system 22 at 100. After the call set-up system 22 answers, he enters the meeting time/date at 102, and the telephone number that he wants to use for the conference call at 104. After entering his telephone number as the meeting host, he enters the telephone number of his colleague at 106. If he wants to have more parties in the conference call, he can enter additional telephone numbers of other parties. After he enters all the telephone numbers, he needs only to hang up at 108, and the call is set for the next day.

Figure 6:
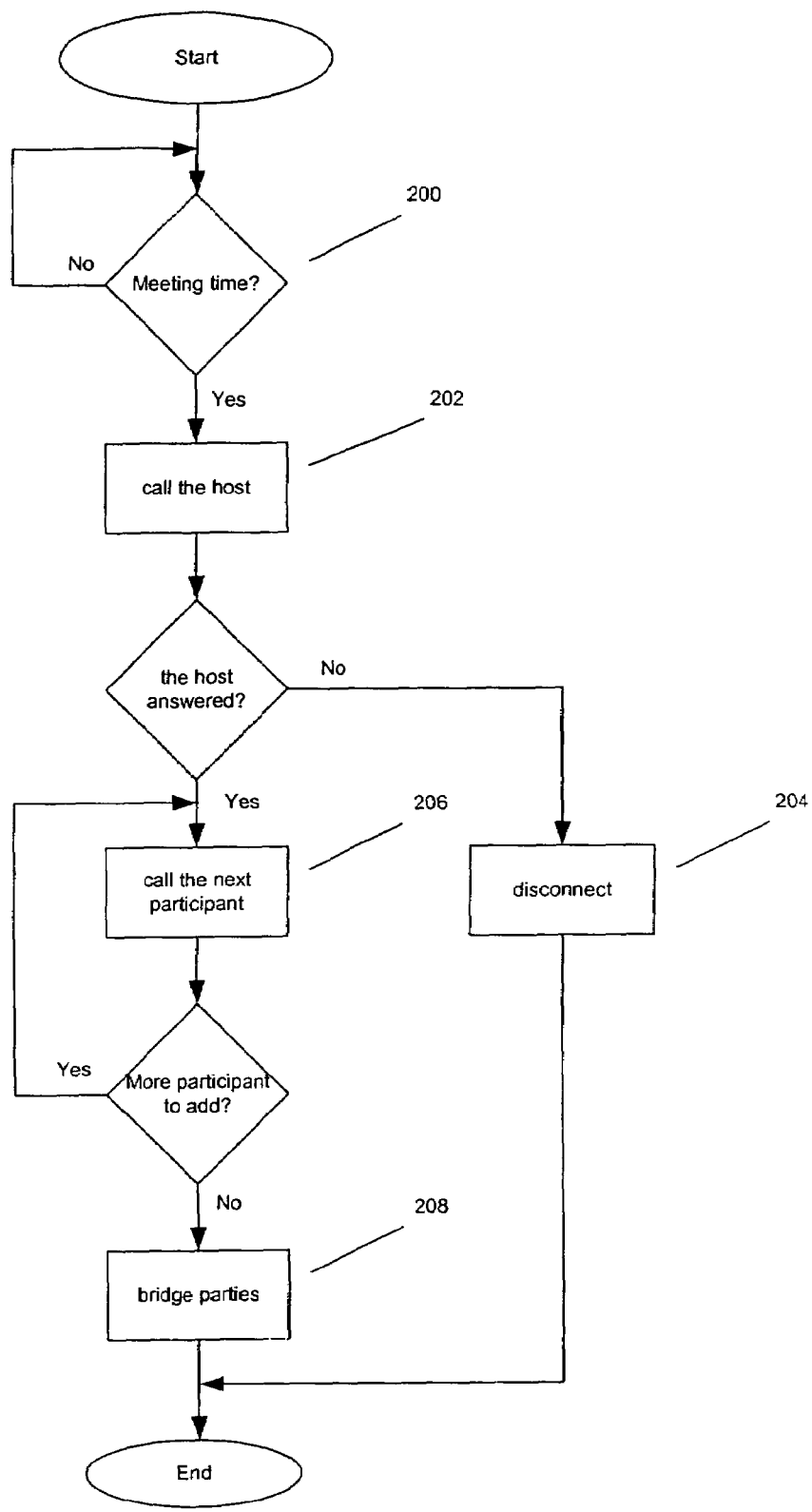
FIG. 6 is a flowchart for setting-up a conference call.

FIG. 6 is a flowchart for the call set-up system process. The call control engine 48 monitors entries in the database 50 and checks for entries 60 that may have the meeting time up at 200. This monitoring and checking can be done by either constant polling of all entries 60 or by expiring timers sending interrupts to the call control engine 48. When it is time for setting-up a conference meeting call for a particular entry 60, the call control engine 48 retrieves the information from the entry 60 and dials the host's telephone number first at 202. If the host does not answer, meaning the host is not available, the call control engine 48 proceeds to disconnect and to remove the entry from the database 50 at 204. Alternately, the call control engine 48 can retry calling the host a few more times before canceling the conference call.

If the host answers the telephone call from the call control engine 48, the call control engine 48 starts to place calls to other meeting participants at 206. The call control engine 48 repeatedly places calls to all meeting participants listed in the entry 60. The call control engine 48 will bridge parties after they answer at 208. A switch that is connected to the call set-up system 22 can handle the call bridging. After the calls are bridged, the call set-up system 22 removes the entry from the database 50 and is ready to handle the next conference call.

Figure 7:
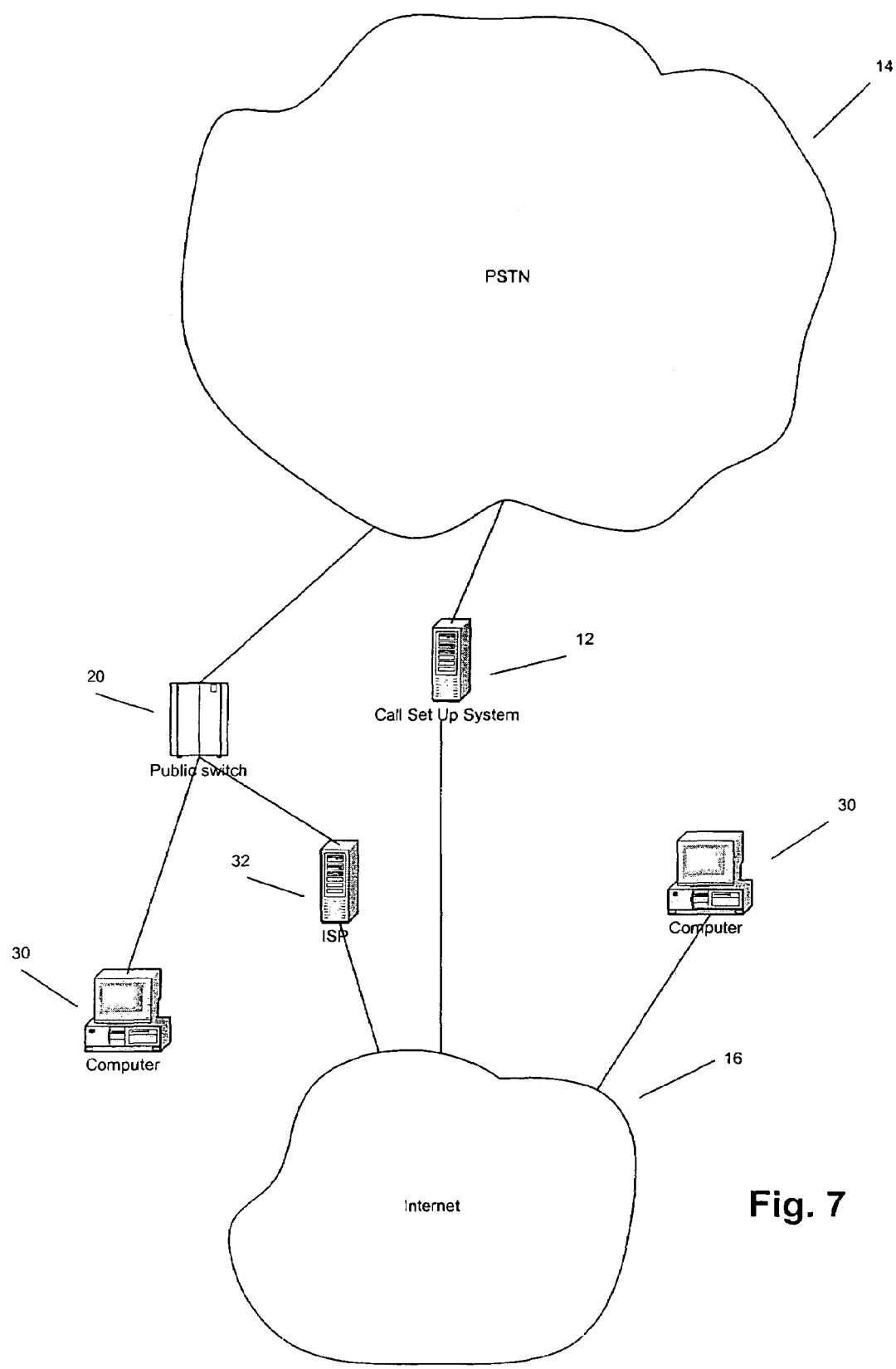
FIG. 7 depicts an alternate embodiment supporting a conference call through the Internet.

In an alternate embodiment, the call set-up system 12 can setup conference calls over the Internet 16 as shown in FIG. 7. In this embodiment the participant's destination information is an e-mail address, or an Internet Protocol (IP) address, instead of a telephone number. Each participant must have a valid e-mail address or an IP address and a computer 30 properly equipped with Internet telephone software that is commercially available. The meeting request provides the meeting date 62, meeting time 64, and the e-mail or IP addresses of each participant. The call set-up system 12 stores this information in an entry 60 in the database 50. At the meeting time, the call set-up system 12 sets an Internet call to each party and bridges them together. The audio path between each party and the call set-up system 12 is through the Internet 16. The audio signals are digitized and sent over the Internet.

In yet another alternate embodiment, the call set-up system 12 provides a meeting confirmation number to the user, and the user car use this confirmation number to change his scheduled conference call. If the user decides to change or to cancel the conference call, he can access the call set-up system 22, provide his confirmation number, and change his conference call. This procedure can also be used if the user no longer remembers the conference call's date and time. He can dial into the call set-up system 12, provide the confirmation number, and the call set-up system 12 will provide the conference date and time from its database.

In yet another embodiment, the call set-up system may reside on the host's computer 30. The host computer 30 is directly connected to the Internet 16 and capable of setting up Internet calls between the user at the host computer 30 and another remote user.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A system for setting-up a future audio conference between a host party and at least one participant party, said system comprising:

a call control engine for receiving a future audio conference request from the host party, the future audio conference request being received in the control engine from at least one of a land-line telephone via a telephone call, a wireless device via a wireless transmission, and a computer via a web interface configured to receive a confirmation screen whereby a user can make corrections related to the future audio conference request, wherein the future audio conference request includes a meeting host phone number, wherein the call control engine is configured to reject the future audio conference request in response to a passing of the future audio conference, and wherein the call control engine is configured to reject the future audio conference request in response to the future audio conference request submitted by a user establishing the future audio conference lacking at least one additional future audio conference call party number for at least one participant party;

a conference call database having a plurality of entries, wherein audio conference information associated with the future audio conference request is stored on one of entries;

a call facility for making audio connections, according to the future audio conference request, to the host party and the at least one participant party, said call facility first attempting an audio connection to the host party and making an audio connection to the at least one participant party after the host party has answered the audio connection, the call facility including a common channel signaling system (CCSS);

a call bridging facility for bridging the audio connections between the host party and the at least one participant; and a timer facility having one or more timers for being set when the future audio conference request is created by the host party, wherein upon expiration of a pre-determined timer setting, indicating that a conference call is to be placed, the call control engine retrieves the future audio conference request information from the conference call database, the future audio conference request information including an entry for the conference call and a timer, the expiration of which indicating that the conference call is to be placed thereby enabling the call facility to begin placing audio connections, wherein the call control engine sets up the future audio conference upon at least one of the expiration of the timers in the timer facility, and a polling of the conference call database to determine whether it is time to retrieve the future audio conference request information and set up the future audio conference, wherein, if the host is unavailable the call control engine disconnects and at least one of removes the audio conference information associated with the future audio conference request from the conference call database, and retries the host before canceling the conference call, wherein if one or more participant parties are unavailable for initial audio connection, then said call facility automatically re-attempts audio connection to said one or more participant parties unavailable for initial audio connection a predetermined number of times before dropping said one or more participant parties unavailable for initial audio connection, wherein the call control engine provides the host party with a meeting confirmation number associated with the future audio conference request, the call control engine changing or canceling the future audio conference request in response to receiving the meeting confirmation number with a request to change or cancel the future audio conference request, and wherein the information associated with the future audio conference request is removed from the conference call database in response to the bridging facility bridging the audio connections between the host party and the at least one participant.

2. The system of claim 1, wherein the future audio conference request includes
   a future meeting time,
   a host destination, and
   at least one participant destination.

3. The system of claim 2, wherein the host destination is a telephone number.

4. The system of claim 2, wherein the at least one participant destination is a telephone number.

5. The system of claim 2, wherein the host destination is an e-mail address.

6. The system of claim 2, wherein the at least one participant destination is an e-mail address.

7. The system of claim 2, wherein the host destination is an Internet Protocol address.

8. The system of claim 2, wherein the at least one participant destination is an Internet Protocol address.

9. The system of claim 1, wherein the audio connections are made through a public switched telephone network.

10. The system of claim 1, wherein the audio connections are made through an Internet.

11. The system of claim 1, wherein the wireless device is a cellular telephone having a display for receiving the prompting for the audio conference information associated with the future audio conference call request and having a keypad for sending the audio conference information.

12. A method for setting-up a future audio conference call between a host party and at least one participant party, the method comprising:

receiving a future audio conference call request from the host party, the conference request being received in a control engine from at least one of a land-line telephone via a telephone call, a wireless device via a wireless transmission, and a computer via a web interface configured to receive a confirmation screen whereby a user can make corrections related to the future audio conference request, and prompting the host party on a communication device for audio conference information associated with the future audio conference call request, wherein the future audio conference request includes a meeting host phone number, wherein a call control engine is configured to reject the future audio conference request in response to a passing of the future audio conference, wherein the call control engine is configured to reject the future audio conference request in response to the future audio conference request submitted by a user establishing the future audio conference lacking at least one additional future audio conference call party number for at least one participant party, and wherein the audio conference information includes
   a future meeting time,
   a host party destination, and
   at least one participant party destination;

storing the future audio conference call request in a database entry;

providing the host party with a meeting confirmation number associated with the future audio conference request;

changing or canceling the future audio conference request in response to receiving the meeting confirmation number with a request to change or cancel the future audio conference request;

retrieving a database entry, including a timer, the expiration of which indicating that a conference call is to be placed, at the future meeting time, in response to at least one of an expiration of a timer in a timer facility, indicating that the conference call is to be placed, the timer being set when the future audio conference request is created by the host party, and a polling of a conference call database to determine whether it is time to retrieve the future audio conference request information and set up the future audio conference;

attempting to connect the host party destination at the future meeting time via a call facility, wherein, if the host is unavailable the call control engine disconnects and at least one of removes the audio conference information associated with the future audio conference request from the conference call database, and retries the host before canceling the conference call;

connecting the at least one participant party destination if the host party destination establishes a connection; and bridging the host party destination to the at least one participant party destination, wherein if one or more participant parties are unavailable for initial audio connection, then said call facility automatically re-attempts audio connection to said one or more participant parties unavailable for initial audio connection a predetermined number of times before dropping said one or more participant parties unavailable for initial audio connection, and
wherein the information associated with the future audio conference request is removed from the conference call database in response to the bridging facility bridging the audio connections between the host party and the at least one participant.

13. The method of claim 12 wherein bridging the host party destination to the at least one participant party destination is accomplished on a telephone switch.

14. The method of claim 12 wherein connecting the host party destination is accomplished through an Internet.

15. The method of claim 12, wherein the setting of the timer includes associating the timer to the database entry.

16. A system for setting future teleconference calls, said system comprising:
a call set-up system having a timer facility, a call facility, a bridging facility, a call control engine, and a conference database, the call set-up system being connected to a public switched telephone network (PSTN) and to an Internet and having access to a common channel signaling system (CCSS), the PSTN including at least one public switch and conferencing hardware, the call set-up system being accessible to by a plurality of communication devices including at least one of a land-line telephone via a telephone call, a telephone being connected to a public switch, the public switch being connected to the PSTN, a wireless device via a wireless transmission, and a computer via a web interface configured to receive a confirmation screen whereby a user can make corrections related to a future audio conference request, wherein the call control engine is configured to reject the future audio conference request in response to a passing of a future audio conference, the call set-up system to perform a method, including:
prompting for teleconference information on a communication device of the plurality of communications devices, the teleconference information including a teleconference date and time, a host telephone number,
wherein the call control engine is configured to reject the future audio conference request in response to the future audio conference request submitted by a user establishing the future audio conference lacking at least one additional future audio conference call party number for at least one participant party;
receiving the teleconference information;
storing the teleconference information in the conference database, the teleconference information including an entry for a teleconference and a timer, the expiration of which indicating that the teleconference is to be started;
retrieving the teleconference information at the teleconference date and time, in response to at least one of an expiration of a timer in the timer facility, the timer being set when the future audio conference request is created by the host party, and the timer expiring when a conference call is to be placed, and a polling of a conference call database to determine whether it is time to retrieve the future audio conference request information and set up the future audio conference;
placing a host call to the host telephone number at the teleconference date and time, wherein, if the host is unavailable the call control engine disconnects and at least one of removes the audio conference information associated with the future audio conference request from the conference call database, and retries the host before canceling the conference call;
after receiving an first answer at the host telephone number, placing at least one participant call to the at least one participant telephone number;
after receiving at least one second answer at the at least one participant telephone number, bridging the host call and the at least one participant call,
wherein if one or more participant parties are unavailable for initial audio connection, then said call facility automatically re-attempts audio connection to said one or more participant parties unavailable for initial audio connection a predetermined number of times before dropping said one or more participant parties unavailable for initial audio connection,
wherein the call control engine provides the host party with a meeting confirmation number associated with the future audio conference request, the call control engine changing or canceling the future audio conference request in response to receiving the meeting confirmation number with a request to change or cancel the future audio conference request, and
wherein the information associated with the future audio conference request is removed from the conference call database in response to the bridging facility bridging the audio connections between the host party and the at least one participant.

17. The system of claim 16, wherein the wireless device includes a cellular telephone, the cellular telephone being in radio communication with a base station, the base station being connected to a mobile switching center (MSC), the mobile switching center being connected to the PSTN.

18. The system of claim 17, wherein the wireless device includes a personal digital assistant (PDA), the PDA being connected to an Internet service provider (ISP) the ISP being connected to a public switch and the Internet, the public switch being connected to the PSTN.

19. The system of claim 18, wherein the computer is connected to an Internet service provider (ISP) the ISP being connected to a public switch and the Internet, the public switch being connected to the PSTN.

* * * * *